March 10, 1942.   H. W. KOST   2,275,773
FASTENING DEVICE
Filed March 30, 1939
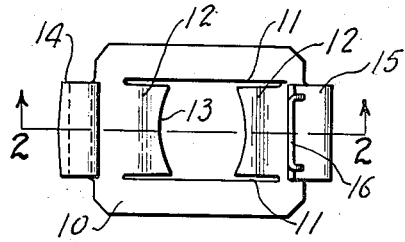
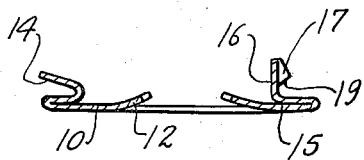
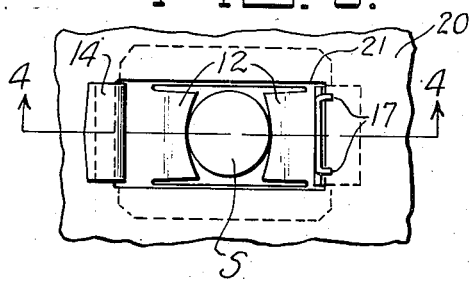
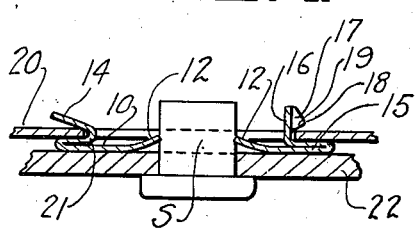
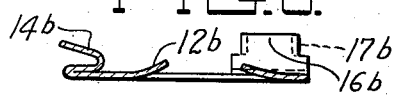
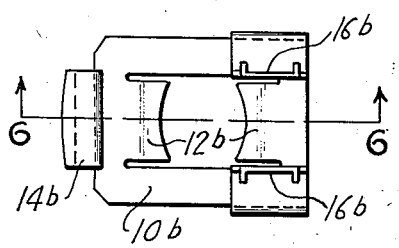
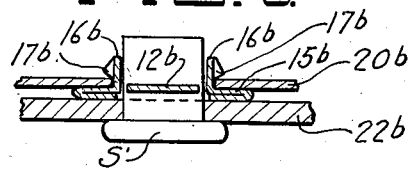
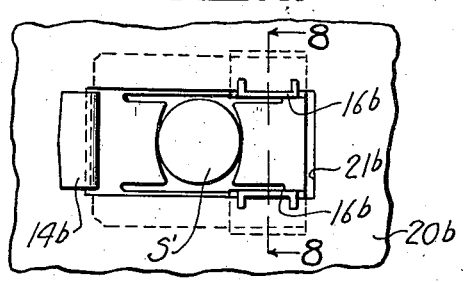
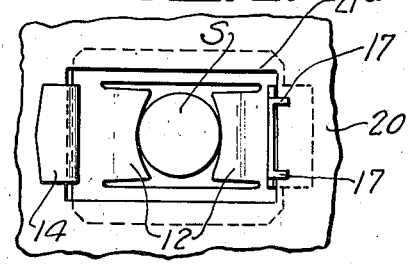
Inventor
Harold W. Kost
By Malcolm W. Fraser
Attorney Patented Mar. 10, 1942

2,275,773

UNITED STATES PATENT OFFICE 2,275,773

FASTENING DEVICE

Harold W. Kost, Birmingham, Mich., assignor to Detroit Harvester Company, Detroit, Mich., a corporation of Michigan Application March 30, 1939, Serial No. 264,957

5 Claims. (Cl. 85—36)

This invention relates to fastening devices, but more particularly to a fastener for studs, screws, or the like, adapted to be mounted upon a panel, or other sheet metal body, which does not conveniently afford access to both sides so that it is necessary or desirable that the fastener be applied to the panel on one side and suitably held in position to receive the stud, screw, or other element, to be connected to or mounted upon the fastener.

An object is to produce a new and improved fastening device which can be readily and conveniently attached to the edge walls of an opening in a sheet metal panel, or other similar body, from one side of the panel, means being provided securely to retain the fastener in place in the aperture so that subsequently a part can be connected to the fastener without displacing the fastener relative to the panel or body to which it is applied.

Another object is to produce a fastener of the above character which is simple and inexpensive to manufacture, and which can be conveniently applied to the walls of an aperture from one side, but is so constructed and arranged that removal of the fastener from the aperture is rendered difficult, thereby militating against accidental or unwarranted separation of the fastener from the walls of the aperture.

For purposes of illustration, but not of limitation, embodiments of the invention are shown in the accompanying drawing, in which:

Figure 1 is a bottom plan view of the fastener;

Figure 2 is a longitudinal sectional view on the line 2—2 of Figure 1;

Figure 3 is a bottom plan view of the fastener applied to an apertured sheet metal panel and showing a stud engaging the fastener;

Figure 4 is a longitudinal sectional view on the line 4—4 of Figure 3;

Figure 5 is a bottom plan view of an alternate form of fastener in which the gripping elements at one end engage side portions of the aperture walls instead of end portions, as in the case of Figures 1 to 4;

Figure 6 is a longitudinal sectional elevation on the line 6—6 of Figure 5;

Figure 7 is a bottom plan view of the fastener shown in Figure 5 in position of use with the same mounted in an aperture panel and a stud in engagement therewith;

Figure 8 is a transverse sectional elevation on the line 8—8 of Figure 7; and

Figure 9 is a bottom plan view of the fastener shown in Figure 3, the aperture in the panel being enlarged to enable limited sidewise adjustment of the fastener within the aperture.

In one aspect the fastener comprises a flat sheet metal body from which is deformed an attaching element to receive a stud, screw, or other object or device. On one end portion of the body is an integral hook, which is adapted to engage in the aperture to which the fastener is to be applied so that the hook engages opposite sides of the edge wall of the aperture. On the opposite end portion of the body is a finger, which may be formed with a flange having a cam surface to impart a flexing action to the associated parts of the fastener upon first engaging the hook and then swinging the body about the hook as an axis flatly against the panel. Adjacent such cam surface is another cam surface, which cooperates with the adjacent portion of the body to impart a gripping action upon the edge wall of the aperture.

The illustrated embodiment of the invention shown on Figures 1 to 4 comprises a relatively thin sheet metal body 10, which is generally rectangular in shape. Preferably, the fastener is formed of spring tempered metal to afford the necessary characteristics. The body 10 is formed with a pair of longitudinal, laterally spaced slits 11, and a portion of the metal is removed in the central portion thereby to form a pair of tongues 12 having slightly curved free end edges 13. Preferably, the tongues 12 are given a slight camber, as illustrated in Figure 2. The tongues 12 are adapted to yield to enable the stud S to be forced therebetween, but firmly grip the peripheral surface of the stud to resist retrograde movement thereof. It is to be understood that other forms of attaching elements may be deformed from the body 10 of the fastener, and the invention is not limited to the use of tongues 12, above described. Suffice it to say that a screw thread attaching element may be deformed from the body, or other mountings, and, therefore, the above described stud-engaging tongues are not to be regarded as limiting.

An extension is provided at one end of the sheet metal body 10 substantially in alignment with the tongues 12, such extension being referred to by the reference numeral 13. As shown in Figure 2, extension 13 is first bent back upon the body 10 of the fastener, and thence bent outwardly to form a hook 14 which opens toward the adjacent end of the body 10. The hook 14 is disposed on the same side of the body as the tongues 12.

The opposite end of the body 10 is likewise provided with an extension substantially in alignment with the tongue 14, the same being folded back upon itself, as indicated at 15, on the same side of the body as the hook 14. The extension is then bent at substantially right angles to the body 10 to provide a finger or flap 16. Formed on opposite edges of the finger or flap 16 are integral substantially triangular flanges 17. Each flange 17 is formed with a cam surface, which inclines from the outer end of the flap 16 outwardly. On the side of each flange 17 facing the body 10 is an inclined or cam surface 19, which inclines inwardly toward the body 10.

Numeral 20 represents a sheet metal panel having a rectangular opening 21. In practice the fastener is mounted on the panel 20 by first inclining the fastener and engaging the hook 14 over an end edge of the opening 21 so that opposite sides of the panel are engaged by the hook 14. Thereafter, the fastener is swung inwardly toward the panel 20 about the hook 14 as a pivot, whereupon the cam surfaces 18 engage the opposite end edge wall of the opening 21 whereupon the fastener is slightly flexed due to the engagement between the edge of the opening and the cam surfaces. After the cam surfaces 18 have passed through the opening, the gripping surfaces 19 engage the underside of the panel adjacent the opening, and due to the camming action grip the adjacent portion of the panel 20 and cooperates with the tongue 14 securely to hold the fastener in position. In this form it will be understood that the length of the opening 21 is so chosen that the fastener will fit snugly in place.

As shown in Figure 9, the opening 21a in the panel is somewhat wider than the opening 21 above described. This enables the fastener to be bodily adjusted transversely of the opening to compensate for differences in locations and to effect desired adjustments. It will be observed in each instance, however, that the body 10 of the fastener extends outwardly beyond the side edges of the opening in the panel as well as beyond the end edges of the panel so that when in place the opening in the panel is completely covered.

As particularly shown in Figure 4, a panel 22 carries the stud S, and this panel can be readily and conveniently connected to the panel 20 by merely pushing the stud S between the fingers 12, which, as above explained, securely hold the stud against rearward or retrograde movement. Thus, after the fastener is in position upon the panel it is extremely simple to fasten the panel 22 in place; all that is necessary is to force the stud axially into engagement with the tongues 12. It will be obvious that any number of fasteners may be used in order to effect secure engagement between the two panels, and their arrangement and location may be varied to fit the demands of service.

The form shown in Figures 5 to 8 is similar to that above described, it being observed that the body 10b is provided with stud engaging tongues 12b and an integral hook 14b at one end of the fastener. At the opposite end of the fastener the gripping elements are arranged to engage opposite sides of the hole in the panel instead of the end edge of the hole. This is desirable in some instances to enable the fastener to have limited longitudinal adjustment instead of lateral adjustment, as afforded by the above described form. In this instance, extensions are formed on opposite sides of the body 10b adjacent the end thereof opposite to the tongue 14b.

As shown, the extensions are bent upon themselves at 15b and then outwardly to provide flap fingers 16b and at opposite ends of each finger 16b is a flange 17b having cam surfaces similar to the cam surfaces above described in connection with the flanges 17. It will be obvious that this fastener is similarly applied by first engaging the hook 14b in the aperture and then swinging the fastener inwardly against the panel 20b, whereupon the cam surfaces on the flanges 17b first cause flexing of the fastener, and thereafter the other cam surfaces impose a gripping action upon the underside of the panel. As shown in Figure 8, the panel 22b carrying the stud S' is forced into juxtaposed relation with the panel 20b, as above described, the stud S' engaging the tongues 12b, as will be readily apparent. It will be apparent that in this form of fastener the opening 21b in the panel 20b may be longer than the opening 21 above described, since a limited amount of longitudinal movement of the fastener within the opening is afforded, such movement being dependent upon the size of the tongue 14b.

From the above description it will be apparent that the fastener may be readily and conveniently snapped into position within an aperture provided in a panel of sheet metal, or other similar material, and such mounting to be possible where only one side of the panel is accessible. The extremely simple construction enables the fastener to be inexpensively manufactured on a production basis without difficulty. The cam surface which enables the fastener to be applied conveniently and the gripping action imparted by the surfaces adjacent these cam surfaces is of importance in militating against the fastener becoming loose from vibrations or shocks imparted to the panel.

Numerous changes in details of construction, arrangement and choice of materials may be effected without departing from the spirit of the invention, especially as defined in the appended claims.

What I claim is:

1. A fastener adapted to be mounted on an apertured panel, comprising a flat sheet metal body, an attaching element forming a part of said body, an integral hook at one end of said body adapted to extend into the aperture in the panel and engage opposite sides of the latter, said hook being formed by bending the metal inwardly upon itself and then outwardly upon itself to provide a hook opening toward the adjacent end of the body, a finger at the opposite end portion of said body and on the same side as said hook and extending at substantially right angles to said body, said finger being formed by bending the metal inwardly upon itself and then outwardly at substantially right angles, a cam surface projecting from said finger engageable with an edge of the aperture to cause flexing of the adjacent parts, whereby the hook is first engaged and thereafter the finger forced into the aperture, and a gripping surface between said cam surface and body to firmly engage the panel adjacent the aperture.

2. A fastener adapted to be mounted on an apertured panel, comprising a flat sheet metal body adapted to lie in close juxtaposition to one side of the panel, attaching means deformed from the outer side of said body, an integral finger on the body adapted to extend into said aperture to engage the inner side of the panel, and means spaced from said finger adapted to have snap engagement with an edge of said aperture, said means including a cam surface adapted to impose a flexing action on associated parts when forced into engagement with an edge of the aperture after said hook is first engaged, and a second cam surface contiguous to said first cam surface arranged to grip the inner edge of the panel aperture and cooperate with said hook in securing the body intimately in substantially flat manner against the panel.

3. A fastener adapted to be mounted on an apertured panel comprising a flat sheet metal body adapted to lie against one side of the panel, attaching means deformed from the outer side of said body, an integral hook in the inner side of the body and formed by bending the metal inwardly upon itself and then outwardly to provide a hook opening toward the adjacent end of the body for engagement with opposite sides of the panel, a pair of fingers on the opposite end portion of said body, each finger being formed by bending a side portion of the body inwardly upon itself and then outwardly at substantially right angles whereby both fingers are adapted to enter the aperture in the panel, cam surfaces on opposite side edges of each finger respectively and disposed laterally of the body to engage an edge of the aperture at each side of the edge engaged by said tongue, and a gripping surface between the inner end of each cam surface and said body.

4. A fastener adapted to be mounted on an apertured panel, comprising a flat sheet metal body, an attaching element deformed from a central portion of the body, an integral hook on one end of said element engageable in the aperture with the inner side of the panel, a finger integral with said body on the other end of the element, a flange integral with said finger having a cam surface for imparting a flexing action to associated fastener parts upon engaging said hook in the aperture and then swinging the body flatly against the panel about the hook as an axis, and a second cam surface contiguous to said first cam surface to grip an edge of the aperture and cooperate with said hook for holding the body in place.

5. A fastener adapted to be mounted on an apertured panel, comprising a flat sheet metal body, an attaching element forming a part of said body, an integral hook on the body adapted to extend into the aperture in the panel to engage the inner side of the panel, a finger at the opposite end portion of said body and on the same side as said hook and extending at substantially right angles to said body, said finger being formed by bending the metal inwardly upon itself and then outwardly at substantially right angles, a cam surface projecting from said finger engageable with an edge of the aperture to cause flexing of the adjacent parts, whereby the hook is first engaged and thereafter the finger forced into the aperture, and a gripping surface between said cam surface and body to firmly engage the panel adjacent the aperture.

HAROLD W. KOST.